United States Patent [19]

Lilley

[11]  4,225,643
[45]  Sep. 30, 1980

[54] RETICULATED POLYVINYL CHLORIDE PLASTISOL FOAMS

[75] Inventor: George L. Lilley, Manheim, Pa.

[73] Assignee: Armstrong Cork Company, Lancaster, Pa.

[21] Appl. No.: 953,362

[22] Filed: Oct. 23, 1978

[51] Int. Cl.² .............................................. B29D 27/04
[52] U.S. Cl. .................................. 428/207; 264/45.5; 264/45.8; 264/50; 264/129; 264/321; 427/270; 427/278; 428/159; 428/204; 428/311; 521/73; 521/74; 521/75; 521/134; 521/145
[58] Field of Search .................... 264/50, DIG. 82, 52, 264/46.4, 45.8, 129, 45.5, 321; 260/899; 428/204, 207, 159, 311; 521/73, 74, 75, 137, 145; 427/270, 278

[56] References Cited

U.S. PATENT DOCUMENTS

| | | | |
|---|---|---|---|
| 3,288,729 | 11/1966 | Waterman et al. | 264/50 X |
| 3,301,798 | 1/1967 | Waterman et al. | 264/50 X |
| 3,471,428 | 10/1969 | Hodgson et al. | 260/899 X |
| 3,640,918 | 2/1972 | Fuchs | 264/50 X |
| 3,660,320 | 5/1972 | Johnson et al. | 521/75 X |
| 3,696,956 | 10/1972 | Merrill et al. | 260/899 X |
| 3,730,931 | 5/1973 | Simoneau et al. | 264/50 X |
| 3,770,670 | 4/1973 | Kuhlow et al. | 521/74 |
| 3,798,189 | 3/1974 | Simoneau et al. | 264/50 X |
| 3,821,059 | 6/1974 | Hensel | 264/52 X |
| 4,002,702 | 1/1977 | Kuhn | 521/75 X |
| 4,097,558 | 6/1978 | Kuhn | 260/899 |

*Primary Examiner*—Philip Anderson
*Attorney, Agent, or Firm*—Dennis M. Kozak

[57] ABSTRACT

Reticulated polyvinyl chloride plastisol foams which can be produced using mechanical frothing techniques are disclosed. These reticulated foams are sufficiently open or porous to facilitate screen printing with plastisol inks to produce thru color, decorative, cushioned floor coverings.

4 Claims, No Drawings

RETICULATED POLYVINYL CHLORIDE PLASTISOL FOAMS

This invention relates to reticulated foam. More specifically, this invention relates to mechanically frothed polyvinyl chloride plastisol foams in reticulated form.

In one of its more specific aspects, this invention relates to mechanically frothed polyvinyl chloride plastisol foams in reticulated form, which foams are suitable for use to produce thru color, decorative, cushioned floor covering.

Mechanically frothed polyvinyl chloride plastisol foams and methods for their production are well known. Typically, a blend of a dispersion grade plastisol resin and a blending or extending grade plastisol resin is mixed with sufficient plasticizer and stabilizer to produce a plastisol into which is incorporated a frothing agent. The plastisol is then mechanically frothed, gelled, and fused to produce a polyvinyl chloride plastisol foam. However, this technology does not facilitate the production of reticulated foams.

The present invention provides reticulated polyvinyl chloride plastisol foams which can be produced using mechanical frothing techniques and which are sufficiently open or porous to facilitate thru color printing using conventional screen printing equipment.

According to this invention there is provided a mechanically frothable, polyvinyl chloride plastisol composition which, when frothed and heated to a temperature above the gelation temperature but below the melt temperature of the plastisol froth, produces a reticulated polyvinyl chloride plastisol foam, the plastisol composition comprising particles of at least one polyvinyl chloride dispersion grade plastisol resin; porous particles of at least one polyvinyl chloride dryblend resin which porous particles will take in plasticizer by absorption and become solvated within a temperature range of from about 130° to about 180° F.; a stabilizer; a plasticizer; and a frothing agent.

Also according to this invention, there is provided a process for producing a reticulated polyvinyl chloride plastisol foam which comprises:

(a) blending particles of at least one polyvinyl chloride dispersion grade plastisol resin with a stabilizer and a plasticizer to form a plastisol;

(b) incorporating into the plastisol porous particles of at least one polyvinyl chloride dryblend resin, the porous particles acting as filler for the plastisol at this point;

(c) incorporating a frothing agent into the plastisol and mechanically frothing the resulting plastisol composition to form a plastisol froth, the plasticizer being the continuous phase of the froth; and, (d) converting the plastisol froth to a reticulated foam by heating the plastisol froth to a temperature below the melt temperature of the plastisol froth but sufficient to sequentially (1) first cause the porous particles of dryblend resin to take in plasticizer by absorption and become solvated, the solvation occurring within a temperature range of from about 130° to about 180° F., (2) second cause the plastisol froth to gel, forming a foam matrix which contains the plasticizer solvated dryblend resin particles, (3) third cause the plasticizer solvated dryblend resin particles to melt onto and become part of the gelled plastisol foam matrix, forming voids where the dryblend resin particles had been, and (4) fourth fuse the gelled plastisol foam matrix, the melted dryblend resin fusing with and becoming homogeneous with the plastisol foam matrix.

As used herein, the term "reticulated foam" is understood to mean a foam which exhibits a greater amount or degree of openness as compared to the openness associated with conventional mechanically frothed open cell foams of like density, and which foam is sufficiently open or porous to facilitate the use of conventional screen printing techniques to print large quantities of plastisol inks into the foam structure to produce a thru color printed foam.

As used herein, the term "thru color" is understood to mean the decorative effect obtained by thru color printing which involves depositing plastisol ink on a porous (e.g., open cell foam) surface at a deposition rate of from about 0.1 to about 1 pound of plastisol ink per square yard of surface, and causing the plastisol ink, depending on processing conditions such as temperature and pressure, to either penetrate the foam structure to a depth within the range of from about 30 to about 150 mils or till and penetrate the foam structure up to a depth of about 60 mils; the resulting thru color foam having plastisol ink through its structure and not just on its surface.

In the practice of this invention, any conventional polyvinyl chloride dispersion grade plastisol resin(s) can be employed.

Particularly suitable polyvinyl chloride dispersion grade plastisol resins are those designated "FPC 605" and "FPC 6337," both commercially available from Firestone Plastics Co.; "SCC 20," commercially available from Stauffer Chemical Co.; and "Tenneco 0565" and "Tenneco 1738," both commercially available from Tenneco Chemical Co.

Optionally, as is well known in the art and for the primary purpose of reducing costs, particles of at least one conventional polyvinyl chloride extending or blending grade plastisol resin can be substituted for a portion of the polyvinyl chloride dispersion grade plastisol resin. A suggested ratio in parts per 100 parts would be about 60–90 parts of polyvinyl chloride dispersion grade plastisol resin and 10–40 parts of an extending or blending grade plastisol resin. Hereinafter the term "total plastisol resin" will be understood to mean the total amount of (1) polyvinyl chloride dispersion grade plastisol resin and (2) polyvinyl chloride blending or extending grade plastisol resin, if employed.

Particularly suitable polyvinyl chloride blending or extending grade plastisol resins are designated "Pliovic M-70" and "Pliovic M-90," both commercially available from Goodyear Tire and Rubber Co.

A blending or extending grade plastisol resin is not to be confused with or considered usable as the dryblend resin of this invention. A blending or extending grade plastisol resin makes use of only particle surface area to absorb plasticizer, whereas, as used herein, the term "dryblend resin" is understood to mean a true dryblend resin, one that will take in plasticizer by absorption and becomes solvated, every particle getting its proportionate share of plasticizer; that is, each particle is capable of being plasticized through to the core with each particle receiving a uniform concentration of plasticizer.

Suitable dryblend resins for use in this invention include "PVC 2160," "PVC 2185," and "PVC 1230P," all commercially available from Air Products and Chemicals, Inc.; "PVC 40" and "PVC 450," both commercially available from Diamond Shamrock Co.; "OPALON 610," commercially available from Monsanto Canada, Ltd.; and "VC 42," commercially available from Bordon Chemical Co.

The porous particles of polyvinyl chloride dryblend resin will be employed in an amount within a range of from about 5 to about 150 parts per 100 parts of total plastisol resin.

It will be readily apparent to one skilled in the art that the amount of dryblend particles employed and the size of the dryblend particles will determine the openness or porosity of the resulting reticulated foam.

The following simple test can be used to determine if a particular polyvinyl chloride dryblend resin is suitable to use to produce a reticulated foam of this invention. First mix all the selected plastisol ingredients, except the dryblend resin particles, forming a plastisol. Then add the dryblend resin particles and disperse them throughout the plastisol. Next, form a plastisol sheet with the unfrothed plastisol and heat the sheet to fuse the plastisol. Recover and observe the fused sheet. If voids are present, the dryblend resin particles melted before the plastisol fused, and the selected dryblend resin is suitable for use to produce a reticulated foam.

Any conventional plasticizer(s) can be employed, being employed in a total amount within the range of from about 30 to about 250 parts per 100 parts of total plastisol resin. A particularly suitable plasticizer is dioctyl phthalate.

Any conventional stabilizer(s) can be employed, being employed in a total amount within the range of from about 1 to about 10 parts per 100 parts of total plastisol resin. Particularly suitable stabilizers are designated "Mark 275," commercially available from Argus Chemical Co., and "Drapex 4—4," also available from Argus Chemical Co.

Mark 275 is dibutyltin bis(alkyl maleate).

Drapex 4—4 is an octyl, epoxy tallate.

Any suitable mechanical frothing agent(s) can be employed, being employed in a total amount within the range of from about 2 to about 8 parts per 100 parts of total plastisol resin. Particularly suitable frothing agents are designated "GE-4254," commercially available from General Electric Silicone, Division of General Electric; and "DC-1250," available from Dow Corning. Both GE4254 and DC-1250 are silicone surfactants.

In addition to the above-described ingredients, the modified plastisol composition can be formulated to include conventional amounts of art recognized surfactants, organic diluents, inorganic fillers, and the like. A typical procedure for preparing a reticulated foam according to this invention is as follows.

The particles of polyvinyl chloride dispersion grade plastisol resin, plasticizer, and stabilizer are added to a mix tank and mixed to form a fluid homogenous plastisol.

Next, the particles of the polyvinyl chloride dryblend resin are added to the plastisol with mixing until the particles of polyvinyl chloride dryblend resin are distributed throughout the resulting plastisol.

A mechanical frothing agent is added to the contents of the main mix tank, and the viscosity of the resulting plastisol is then checked to see if the plastisol can be adequately frothed by mechanical methods. If the viscosity falls within the range of from about 500 to about 8,000 centipoise (all viscosities listed herein were measured using a Brookfield Viscometer, Model RVF, #6 spindle, 20 rpm), processing is continued. If the viscosity is outside of this range, either additional plasticizer or up to 8 parts of an organic diluent (e.g., mineral spirits) per 100 parts of total plastisol resin can be added to adjust the viscosity. If the viscosity cannot be adjusted to within 500 to 8,000 centipoise with either additional plasticizer or up to 8 parts of organic diluent, the plastisol cannot be adequately frothed. Possibly the selected dryblend resin particles are increasing the viscosity of the plastisol by solvating below 130° F., and a different dryblend resin should be selected using the previously-described test.

The resulting plastisol composition is then mechanically frothed in conventional equipment such as an Oakes foamer to form a plastisol froth; the polyvinyl chloride dryblend resin particles act as filler at this point and are dispersed in the continuous liquid phase of the froth, which is the plasticizer.

After frothing, the resulting plastisol froth can be conventionally deposited to any desired thickness, up to about ½ inch, using any conventional applicator, for example, a blade over roll applicator, being applied to any conventional backing, release carrier, or substrate surface selected for specific end application.

Next, the plastisol froth is heated continuously from room temperature up to at least the fusion temperature of the plastisol froth but below the melt temperature of the plastisol resin or resin blend using any conventional method, for example, hot air oven. As an alternative to continuous heating, separate heating steps can be employed, for example, the froth can be heated to gelation temperature, cooled, and reheated to fusion temperature.

Several changes occur during the heating process. First, at a temperature within the range of from about 130° to about 180° F., the particles of dryblend resin take in plasticizer by absorption and become solvated. This solvation is believed to lower the melt viscosity of the dryblend resin particles, that is, the plasticizer solvated particles will now melt at a lower temperature than they would if unsolvated. And, accordingly, the plasticizer solvated particles will now melt below the fusion temperature of the plastisol froth. Then, secondly, at a temperature within the range of about 200° to about 325° F., the plastisol froth gels and forms a foam matrix or interconnected network containing the plasticizer solvated dryblend resin particles. Thirdly, at a temperature above the gelation temperature but below the fusion temperature of the plastisol froth, the solvated particles of dryblend resin melt, changing from porous particles to a liquid and leaving voids or air cells throughout the plastisol froth where the particles had been. It is believed that the liquid (molten vinyl) flows onto and becomes part of the gelled plastisol foam matrix at this point. Finally, at the fusion temperature of the plastisol froth, the melted dryblend resin fuses with and becomes homogeneous with the plastisol foam matrix, thus forming a reticulated foam.

As described above, one skilled in the art will readily recognize that it is critical in this invention that the particles of polyvinyl chloride dryblend resin become solvated above room temperature, preferably within a temperature range of from about 130° to about 180° F. This avoids processing difficulties due to viscosity buildup. Also it is critical that the plasticizer solvated dryblend resin particles melt at a temperature which is above the gelation temperature of the plastisol froth but below the melt temperature of the plastisol froth; if the particles do not melt below the melt temperature, no voids and thus no reticulated foam will form.

Having described the materials and methods of this invention, reference is now made to the following examples which are provided by way of illustration and not limitation of the practices of this invention.

EXAMPLE I

This example demonstrates the best mode for producing a reticulated polyvinyl chloride plastisol foam of this invention. The following plastisol composition was employed.

| Materials | Parts per 100 Total Parts of Plastisol Resin |
|---|---|
| Polyvinyl chloride dispersion grade plastisol resin particles ("FPC 605") | 40.0 |
| Polyvinyl chloride dispersion grade plastisol resin particles ("SCC-20") | 35.0 |
| Polyvinyl chloride blending grade plastisol resin particles ("Pliovic M-70") | 25.0 |
| | 100.0 |
| Plasticizer - dioctyl phthalate | 120.0 |
| Stabilizer - organo tin compound "Mark 275" | 6.5 |
| Polyvinyl chloride dryblend resin particles ("PVC 2160") | 85.0 |
| Frothing agent "GE-4254" | 8.0 |

The total amounts of plasticizer (dioctyl phthalate) and stabilizer ("Mark 275") were added to a premix tank at room temperature with agitation.

The total amounts of both polyvinyl chloride dispersion grade plastisol resins ("FPC 605" and "SCC-20"), the total amount of polyvinyl chloride blending grade plastisol resin, and one-third of the contents of the premix tank were added to a main mix tank at room temperature with agitation.

To the resulting paste was added the remaining contents of the premix tank at room temperature with agitation. Agitation was continued, a fluid homogeneous plastisol was formed, and then the total amount of the polyvinyl chloride dryblend resin ("PVC 2160") was added to the plastisol and uniformly distributed throughout the plastisol with agitation.

Next the total amount of frothing agent ("General Electric GE-4254") was added to the plastisol at room temperature with agitation.

The resulting plastisol composition was tested and found to have a viscosity of about 1,600 cps.

The plastisol composition was recovered and placed in a commercial SKG foamer (Model FV75), available from SKG Industries, Reading, Pennsylvania, and mechanically frothed.

The resulting frothed plastisol was applied to a thickness of 150 mils to a "Methocel" coated asbestos fiber carrier sheet using a conventional doctor blade applicator.

The plastisol froth coated sheet was placed in a hot air flat shelf oven at an oven temperature of about 275° F. After about 5 minutes, the coated sheet was removed from the oven and cooled to room temperature. The resulting gelled plastisol froth was observed to have particles of polyvinyl chloride dryblend resin dispersed throughout.

Next the gelled sheet was placed in a hot air flat shelf oven at an oven temperature of about 380° F. After about two minutes, the product was recovered as a reticulated polyvinyl chloride plastisol foam and found to have a density of about 24 pounds per cubic foot.

EXAMPLE II

This example demonstrates the preparation of a reticulated polyvinyl chloride plastisol foam of this invention using substantially the same procedure used in Example I and using the following materials.

| Materials | Parts per 100 Total Parts of Plastisol Resin |
|---|---|
| Polyvinyl chloride dispersion grade plastisol resin particles ("FPC 605") | 40.0 |
| Polyvinyl chloride dispersion grade plastisol resin particles ("SCC-20") | 40.0 |
| Polyvinyl chloride blending grade plastisol resin particles ("Pliovic M-70") | 20.0 |
| | 100.0 |
| Plasticizer - dioctyl phthalate | 33.0 |
| Stabilizer - organo tin compound "Mark 275" | 2.0 |
| Polyvinyl chloride dryblend resin particles ("PVC 2160") | 10.0 |
| Frothing agent "DC-1252" | 7.5 |
| Organic diluent - mineral spirits | 4.0 |

The only significant difference in the process of this example as compared to Example I was that the plastisol, when tested, was found to have a viscosity greater than 8,000 cps. Accordingly, about 4 parts of mineral spirits were added to the plastisol at room temperature with agitation, and the viscosity was retested and found to be about 8,000 cps.

Upon completion of the process, the product was allowed to cool to room temperature and recovered as a reticulated polyvinyl chloride plastisol foam and found to have a density of about 29 pounds per cubic foot.

EXAMPLE III

This example demonstrates the preparation of a reticulated polyvinyl chloride plastisol foam of this invention using substantially the same procedure used in Example I and using the following materials:

| Materials | Parts per 100 Total Parts of Plastisol Resin |
|---|---|
| Polyvinyl chloride dispersion grade plastisol resin particles ("FPC 605") | 40.0 |
| Polyvinyl chloride dispersion grade plastisol resin particles ("SCC-20") | 40.0 |
| Polyvinyl chloride blending grade plastisol resin particles ("Pliovic M-70") | 20.0 |
| | 100.0 |
| Plasticizer - dioctyl phthalate | 250.0 |
| Stabilizer - organo tin compound "Mark 275" | 2.0 |
| Polyvinyl chloride dryblend resin particles ("PVC 2160") | 150.0 |
| Frothing agent "DC-1252" | 7.5 |

The only significant difference in the processing of this example as compared to Example I was that the plastisol composition when tested was found to have a viscosity of about 500 cps.

Upon completion of the process, the product was allowed to cool to room temperature and recovered as a reticulated polyvinyl chloride plastisol foam and found to have a density of about 25 pounds per cubic foot.

EXAMPLE IV

This example demonstrates the preparation of a thru color, decorative, cushioned floor covering of this invention using the plastisol composition of Example I.

The plastisol composition was mixed according to the procedure of Example I, found to have a viscosity of about 1,600 cps, and then placed into a commercial SKG continuous mixer (Model FV200), available from SKG Industries, and mechanically frothed.

The resulting plastisol froth was knife coated to a thickness of about 150 mils onto a "Methocel" coated paper carrier sheet.

The plastisol froth coated carrier sheet was placed in a hot air oven at an oven temperature of about 380° F. After about 2½ minutes, the resulting product was recovered from the oven as a reticulated polyvinyl chloride plastisol foam having a density of about 24 pounds per cubic foot and allowed to cool to room temperature.

The resulting reticulated foam sheet was then fed into a rotary screen printer where two conventional plastisol inks, each having a viscosity of about 3,000 cps, were deposited at a deposition rate of 0.5 pound of plastisol ink per square yard of foam to fill the upper 40 mil portion of the reticulated foam, forming an in-register printed, thru color pattern on the entire foam surface, a different color ink being applied for each of the two screens employed.

Next, the resulting thru color printed surface was planished using a chrome roll, steam heated to a temperature of about 280° F., which planish served to gel the plastisol printing inks and form a nonporous smooth foam surface.

A clear coat of plastisol was reverse roll coated to a thickness of about 10 mils onto the planished foam surface and the resulting clear coated, printed reticulated foam was subjected to top radiant heat sufficient to achieve a foam surface temperature of about 380° F. and fuse the clear coat and plastisol printing inks.

While still hot, the foam structure was mechanically embossed using a water cooled embossing roll with sufficient pressure to emboss without collapsing the foam structure.

The resulting product was recovered as a thru color, decorative, cushioned floor covering and found to have an excellent print image and about a 10 to 15 mil embossed effect.

It will be evident from the foregoing that various modifications can be made to the present invention. For example, in the preparation of a floor covering, the separate application of a clear coat can be eliminated and the plastisol inks formulated to serve as the wear surface. Such modifications are considered as being within the scope of this invention.

What is claimed is:

1. A process for producing a reticulated polyvinyl chloride plastisol foam which comprises:
    (a) blending particles of at least one polyvinyl chloride dispersion grade plastisol resin with a stabilizer and a plasticizer to form a plastisol;
    (b) incorporating into the plastisol particles of at least one polyvinyl chloride dryblend resin, which particles will take in plasticizer by absorption and become solvated, each particle receiving a uniform concentration of plasticizer, the particles acting as filler at this point and being dispersed in the plastisol;
    (c) incorporating a frothing agent into the plastisol and mechanically frothing the resulting plastisol composition to form a plastisol froth, the plasticizer being the continuous phase of the froth;
    (d) depositing a layer of the plastisol froth on a backing sheet; and,
    (e) converting the plastisol froth to a reticulated foam by heating the plastisol froth to a temperature below the melt temperature of the plastisol froth but sufficient to sequentially (1) first cause the particles of dryblend resin to take in plasticizer by absorption and become solvated, the solvation occurring within a temperature range of from about 130° to about 180° F., (2) second cause the plastisol froth to gel, forming a foam matrix which contains the plasticizer solvated dryblend resin particles, (3) third cause the plasticizer solvated dryblend resin particles to melt onto and become part of the gelled plastisol foam matrix, forming voids where the dryblend resin particles had been, and (4) fourth fuse the gelled plastisol foam matrix, during which heating the melted dryblend resin fuses with and becomes homogeneous with the plastisol foam matrix.

2. The process of claim 1 in which said incorporating into the plastisol particles of at least one polyvinyl chloride dryblend resin is carried out by adding and dispersing in the plastisol particles of at least one polyvinyl chloride dryblend resin in an amount within the range of from about 5 to about 150 parts per 100 parts of total plastisol resin.

3. The process of claim 1 comprising in addition the step in which at least one plastisol ink is thru color printed into the foam structure by depositing the ink at a deposition rate of from about 0.1 to about 1 pound of plastisol ink per square yard of foam surface.

4. A thru color, decorative cushioned floor covering produced according to the process of claim 3.

* * * * *